United States Patent
Park et al.

(10) Patent No.: US 12,148,875 B2
(45) Date of Patent: Nov. 19, 2024

(54) LITHIUM SECONDARY BATTERY

(71) Applicant: LG CHEM, LTD., Seoul (KR)

(72) Inventors: Eunkyung Park, Daejeon (KR);
Minchul Jang, Daejeon (KR); Suk Il Youn, Daejeon (KR); Byoungkuk Son, Daejeon (KR); Changhun Park, Daejeon (KR); Doyeon Kim, Daejeon (KR); Bora Jung, Daejeon (KR); Yeilin Ham, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 658 days.

(21) Appl. No.: 17/040,500

(22) PCT Filed: Oct. 31, 2019

(86) PCT No.: PCT/KR2019/014570
§ 371 (c)(1),
(2) Date: Sep. 22, 2020

(87) PCT Pub. No.: WO2020/091448
PCT Pub. Date: May 7, 2020

(65) Prior Publication Data
US 2021/0028484 A1    Jan. 28, 2021

(30) Foreign Application Priority Data

Oct. 31, 2018  (KR) .......................... 10-2018-0131581
Oct. 31, 2019  (KR) .......................... 10-2019-0137128

(51) Int. Cl.
*H01M 10/052*  (2010.01)
*C01G 51/00*  (2006.01)
(Continued)

(52) U.S. Cl.
CPC .......... *H01M 10/052* (2013.01); *C01G 51/42* (2013.01); *C01G 53/42* (2013.01); *H01M 4/0445* (2013.01);
(Continued)

(58) Field of Classification Search
None
See application file for complete search history.

(56) References Cited

U.S. PATENT DOCUMENTS 6,255,020 B1   7/2001  Yamashita et al.
6,365,300 B1   4/2002  Ota et al.
(Continued)

FOREIGN PATENT DOCUMENTS

CN    103718337 A    4/2014
CN    104170150 A   11/2014
(Continued)

OTHER PUBLICATIONS

Takada, Kazunori. "Solid Electrolytes and Solid-State Batteries." AIP Conference Proceedings, 2016, https://doi.org/10.1063/1.4961900. (Year: 2016).*

(Continued)

*Primary Examiner* — Robert S Carrico
(74) *Attorney, Agent, or Firm* — Birch, Stewart, Kolasch & Birch, LLP

(57) ABSTRACT

A lithium secondary battery including a positive electrode, a negative electrode comprising a negative electrode current collector, and an electrolyte disposed between the positive electrode and the negative electrode; and a lithium metal layer on the negative electrode current collector in the negative electrode. The electrolyte includes a first electrolyte layer and a second electrolyte disposed on the first electrolyte layer, wherein the first electrolyte layer faces the negative electrode, and the second electrolyte layer faces the (Continued)

positive electrode. The first electrolyte layer has higher ion conductivity than the second electrolyte layer, and wherein the lithium metal layer is formed by migration of lithium ions from the positive electrode after charging.

18 Claims, 2 Drawing Sheets

(51) Int. Cl.
| | |
|---|---|
| *C01G 53/00* | (2006.01) |
| *H01M 4/04* | (2006.01) |
| *H01M 4/131* | (2010.01) |
| *H01M 4/136* | (2010.01) |
| *H01M 4/1395* | (2010.01) |
| *H01M 4/38* | (2006.01) |
| *H01M 4/505* | (2010.01) |
| *H01M 4/525* | (2010.01) |
| *H01M 10/0565* | (2010.01) |
| *H01M 10/0566* | (2010.01) |

(52) U.S. Cl.
CPC ........... *H01M 4/131* (2013.01); *H01M 4/136* (2013.01); *H01M 4/1395* (2013.01); *H01M 4/382* (2013.01); *H01M 4/505* (2013.01); *H01M 4/525* (2013.01); *H01M 10/0565* (2013.01); *H01M 10/0566* (2013.01); *H01M 2300/0094* (2013.01)

(56) References Cited

U.S. PATENT DOCUMENTS

| | | | |
|---|---|---|---|
| 6,576,371 B1 | 6/2003 | Yasuda et al. | |
| 9,680,181 B2 | 6/2017 | Rhee et al. | |
| 2002/0018935 A1 | 2/2002 | Okada | |
| 2004/0157124 A1 | 8/2004 | Goh et al. | |
| 2004/0209159 A1 | 10/2004 | Lee et al. | |
| 2005/0118496 A1* | 6/2005 | Chang | H01M 4/366 |
| | | | 429/231.1 |
| 2006/0251967 A1* | 11/2006 | Goh | H01M 4/525 |
| | | | 429/223 |
| 2006/0257737 A1 | 11/2006 | Goh et al. | |
| 2009/0162754 A1 | 6/2009 | Cotton et al. | |
| 2009/0317724 A1 | 12/2009 | Kumar et al. | |
| 2012/0094189 A1 | 4/2012 | Scrosati et al. | |
| 2012/0301788 A1* | 11/2012 | Kim | H01M 4/131 |
| | | | 252/182.1 |
| 2013/0017441 A1 | 1/2013 | Affinito et al. | |
| 2013/0095380 A1 | 4/2013 | Affinito et al. | |
| 2013/0188294 A1 | 7/2013 | Kim et al. | |
| 2013/0260257 A1 | 10/2013 | Choi | |
| 2014/0011098 A1 | 1/2014 | Jeon et al. | |
| 2014/0030607 A1 | 1/2014 | Noguchi | |
| 2014/0093774 A1 | 4/2014 | Yoon | |
| 2014/0093784 A1* | 4/2014 | Kwon | H01M 10/0565 |
| | | | 429/246 |
| 2014/0106236 A1* | 4/2014 | Kwon | H01M 10/0565 |
| | | | 429/309 |
| 2014/0377619 A1 | 12/2014 | Kwon et al. | |
| 2014/0377857 A1 | 12/2014 | Lim et al. | |
| 2015/0132626 A1 | 5/2015 | Park et al. | |
| 2015/0295246 A1 | 10/2015 | Son et al. | |
| 2015/0349378 A1* | 12/2015 | Ose | H01M 4/139 |
| | | | 29/623.1 |
| 2016/0036091 A1 | 2/2016 | Ohtomo et al. | |
| 2017/0104209 A1 | 4/2017 | Son et al. | |
| 2017/0133660 A1 | 5/2017 | Kurihara et al. | |
| 2017/0133709 A1 | 5/2017 | Masuda et al. | |
| 2017/0141402 A1 | 5/2017 | Affinito et al. | |
| 2017/0244093 A1 | 8/2017 | Fan | |
| 2017/0294671 A1 | 10/2017 | Jin et al. | |
| 2018/0034101 A1 | 2/2018 | Lee et al. | |
| 2018/0131004 A1* | 5/2018 | Yang | H01M 10/0525 |
| 2018/0159169 A1* | 6/2018 | Ko | H01M 10/0565 |
| 2018/0197691 A1 | 7/2018 | Song et al. | |
| 2018/0323430 A1 | 11/2018 | Son et al. | |
| 2018/0323467 A1 | 11/2018 | Tang et al. | |
| 2019/0067702 A1 | 2/2019 | Son et al. | |
| 2019/0198913 A1 | 6/2019 | Koh et al. | |
| 2020/0127293 A1 | 4/2020 | Son et al. | |

FOREIGN PATENT DOCUMENTS

| | | | | |
|---|---|---|---|---|
| CN | 104221206 A | | 12/2014 | |
| JP | 5-298915 A | | 11/1993 | |
| JP | 09161799 A | * | 6/1997 | |
| JP | 9-283125 A | | 10/1997 | |
| JP | 11-307129 A | | 11/1999 | |
| JP | 2000294242 A | * | 10/2000 | |
| JP | 2002-237293 A | | 8/2002 | |
| JP | 2004-206942 A | | 7/2004 | |
| JP | 3578015 B2 | | 10/2004 | |
| JP | 3640863 B2 | | 4/2005 | |
| JP | 2010-231950 A | | 10/2010 | |
| JP | 2014-26806 A | | 2/2014 | |
| JP | 5588128 B2 | | 9/2014 | |
| JP | 2015-69809 A | | 4/2015 | |
| JP | 2016-35867 A | | 3/2016 | |
| JP | 2016-91984 A | | 5/2016 | |
| KR | 10-0125151 B1 | | 12/1997 | |
| KR | 10-0285123 B1 | | 3/2001 | |
| KR | 10-2002-0085942 A | | 11/2002 | |
| KR | 10-0368438 B1 | | 1/2003 | |
| KR | 10-2004-0090561 A | | 10/2004 | |
| KR | 10-0484713 B1 | | 4/2005 | |
| KR | 10-2006-0111393 A | | 10/2006 | |
| KR | 10-0658546 B1 | | 12/2006 | |
| KR | 10-2010-0098548 A | | 9/2010 | |
| KR | 10-1107731 B1 | | 1/2012 | |
| KR | 10-2012-0035131 A | | 4/2012 | |
| KR | 10-2012-0092918 A | | 8/2012 | |
| KR | 10-2013-0042513 A | | 4/2013 | |
| KR | 10-2013-0111833 A | | 10/2013 | |
| KR | 10-2013-0112567 A | | 10/2013 | |
| KR | 10-2013-0134949 A | | 12/2013 | |
| KR | 10-1336943 B1 | | 12/2013 | |
| KR | 10-2014-0083024 A | | 7/2014 | |
| KR | 10-2014-0110373 A | | 9/2014 | |
| KR | 10-2014-0112597 A | | 9/2014 | |
| KR | 10-2014-0132294 A | | 11/2014 | |
| KR | 10-2015-0030156 A | | 3/2015 | |
| KR | 10-2015-0101235 A | | 9/2015 | |
| KR | 10-1551521 B1 | | 9/2015 | |
| KR | 10-2015-0129534 A | | 11/2015 | |
| KR | 10-2015-0143372 A | | 12/2015 | |
| KR | 10-2016-0051196 A | | 5/2016 | |
| KR | 10-2016-0052323 A | | 5/2016 | |
| KR | 10-1648465 B1 | | 8/2016 | |
| KR | 10-2016-0136247 A | | 11/2016 | |
| KR | 10-2016-0136248 A | | 11/2016 | |
| KR | 2016128014 A | * | 11/2016 | ............ H01M 10/05 |
| KR | 10-2016-0138120 A | | 12/2016 | |
| KR | 10-2017-0003209 A | | 1/2017 | |
| KR | 10-2017-0024862 A | | 3/2017 | |
| KR | 10-2017-0053125 A | | 5/2017 | |
| KR | 10-2017-0123727 A | | 11/2017 | |
| KR | 10-1805545 B1 | | 12/2017 | |
| KR | 10-2018-0007798 A | | 1/2018 | |
| KR | 10-2018-0010423 A | | 1/2018 | |
| KR | 10-2018-0032168 A | | 3/2018 | |
| KR | 10-1850901 B1 | | 4/2018 | |
| KR | 10-2018-0056916 A | | 5/2018 | |
| KR | 10-2018-0067586 A | | 6/2018 | |
| KR | 10-1865834 B1 | | 6/2018 | |
| KR | 10-2018-0076709 A | | 7/2018 | |

(56) References Cited

FOREIGN PATENT DOCUMENTS

| KR | 10-2018-0092180 A | 8/2018 |
| WO | WO 2013/137224 A1 | 9/2013 |

OTHER PUBLICATIONS

Xue, Zhigang, et al. "Poly(Ethylene Oxide)-Based Electrolytes for Lithium-Ion Batteries." Journal of Materials Chemistry A, vol. 3, No. 38, 2015, pp. 19218-19253., https://doi.org/10.1039/c5ta03471j. (Year: 2015).*

Fan, Li-Zhen, et al. "Enhanced ionic conductivities in composite polymer electrolytes by using succinonitrile as a plasticizer." Solid State Ionics 179.27-32 (2008): 1772-1775. (Year: 2008).*

European Office Action Search Report dated Apr. 22, 2021 in family application EP19879111.3.

International Search Report for PCT/KR2019/014570 (PCT/ISA/210) mailed on Feb. 11, 2020.

Ohta et al., "LiNbO3-coated LiCoO2 as cathode material for all solid-state lithium secondary batteries". Electrochemistry Communications, vol. 9, 2007, pp. 1486-1490.

Qian et al., "Anode-Free Rechargeable Lithium Metal Batteries", Advanced Functional Materials, vol. 26, 2016, pp. 7094-7102.

Qian et al., "High rate and stable cycling of lithium metal anode", Nature communications, vol. 6, 2015, pp. 1-9.

Tominaga et al., "Fast Li-ion conduction in poly(ethylene carbonate)-based electrolytes and composites filled with TiO2 nanoparticles", Chem. Commun., vol. 50, 2014, pp. 4448-4450.

Yan et al., "Ultrathin Two-Dimensional Atomic Crystals as Stable Interfacial Layer for Improvement of Lithium Metal Anode", Nano Letters, vol. 14, 2014, pp. 6016-6022.

Zhang et al., "Lithium bis (fluorosulfonyl)imide/poly(ethylene oxide) polymer electrolyte", Electrochimica Acta, vol. 133, 2014, pp. 529-538.

Jia et al., "Applied Electrochemistry," Higher Education Press, Jul. 31, 2004, pp. 186-187 (6 pages total) with English translation.

Xie et al., "New Generation Lithium Secondary Battery Technology," Defense Industry Publishing House, Aug. 31, 2013, pp. 239-241 (11 pages total), with English translation.

* cited by examiner

[Figure 1]
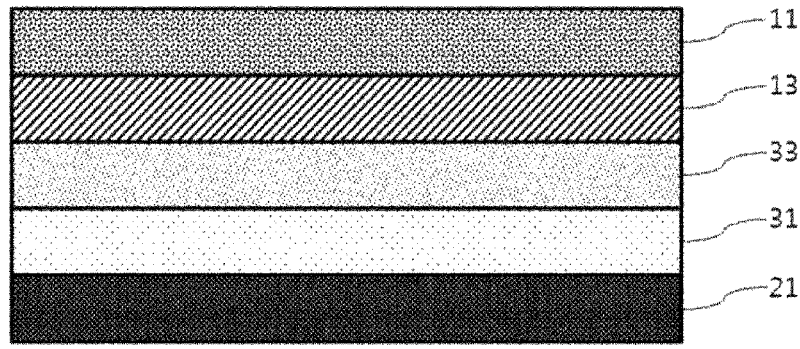
[Figure 2]
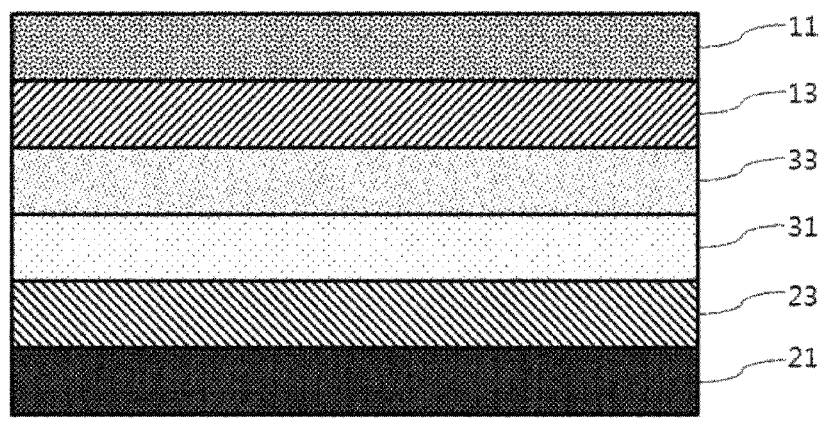
[Figure 3] - Conventional Art
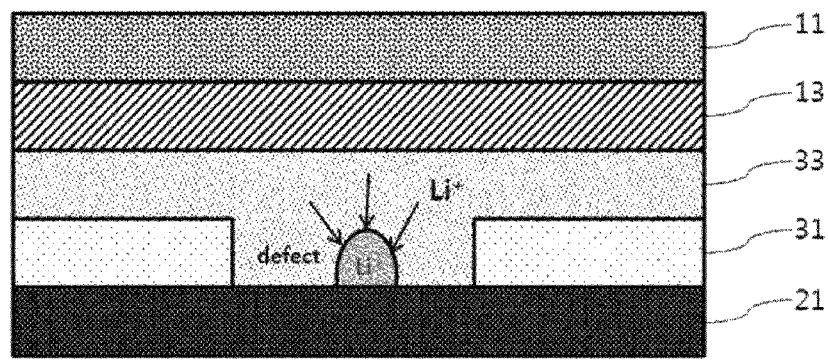

[Figure 4]
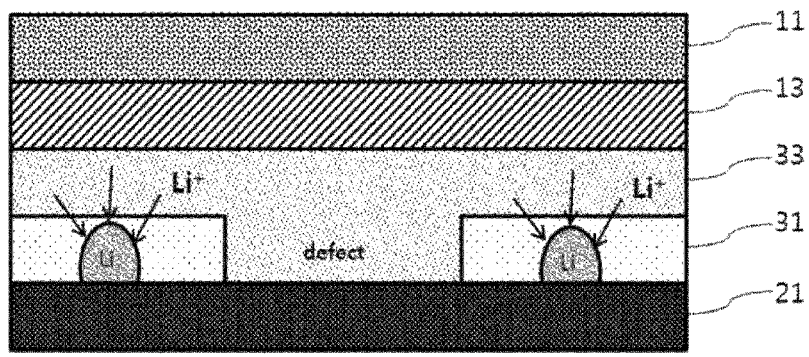

LITHIUM SECONDARY BATTERY

TECHNICAL FIELD

This application claims priority to and the benefits of based on Korean Patent Application No. 10-2018-0131581 filed on Oct. 31, 2018, and Korean Patent Application No. 10-2019-0137128 filed on Oct. 31, 2019, the entire disclosure of which are incorporated herein by reference its entirety.

The present invention relates to a negative electrode free-structured lithium secondary battery comprising an electrolyte having differential ion conductivity.

BACKGROUND ART

Various battery-requiring devices from portable phones, wireless home appliances to electric vehicles have been recently developed, and with the development of such devices, demands for secondary batteries have also increased. Particularly, with the trend of smaller electronic goods, secondary batteries tend to be lighter and smaller as well.

Corresponding to such a trend, lithium secondary batteries using lithium metal as an active material have recently received attention. Lithium metal has a property of low oxidation-reduction potential (−3.045 V with respect to standard hydrogen electrode) and large weight energy density (3,860 mAhg$^{-1}$), and has been expected as a negative electrode material of high capacity secondary batteries.

However, when using lithium metal as a battery negative electrode, the battery is generally manufactured by attaching lithium foil on a flat current collector, and since lithium explosively reacts with water and also reacts with oxygen in the atmosphere with its high reactivity as an alkali metal, there is a disadvantage in that manufacture and use are difficult under general environments. Particularly, an oxide layer such as LiOH, Li$_2$O and Li$_2$CO$_3$ is obtained as a result of oxidation when lithium metal is exposed to the atmosphere. When a surface oxide layer (native layer) is present on the surface, the oxide layer functions as an insulator film decreasing electric conductivity, and causes a problem of increasing electric resistance by inhibiting smooth lithium ion migration.

For such a reason, the problem of forming a surface oxide layer caused by lithium metal reactivity has been partly improved by performing a vacuum deposition process in forming a lithium negative electrode, however, fundamental suppression of surface oxide layer formation is still impossible by the exposure to the atmosphere during a battery assembly process. In view of the above, development of a lithium metal electrode capable of resolving a lithium reactivity problem and more simplifying a process while increasing energy efficiency by using lithium metal has been required.

PRIOR ART DOCUMENTS

Patent Document

Korean Patent Publication No. 10-2016-0052323 "Lithium Electrode and Lithium Battery Comprising the Same"

DISCLOSURE

Technical Problem

As a result of extensive studies in view of the above, the inventors of the present invention have designed a negative electrode free battery structure capable of forming a lithium metal layer on a negative electrode current collector using lithium ions transferred from a positive electrode active material through charge after assembling the battery so as to fundamentally block a contact of the lithium metal with the atmosphere when assembling the battery, and have developed a composition of a positive electrode active material capable of stably forming the lithium metal layer. In addition, the inventors of the present invention have developed a lithium secondary battery capable of, by including two or more electrolyte layers having different ion conductivity, suppressing dendrite growth by a difference in the ion conductivity.

Accordingly, it is an object of the present invention provide a lithium secondary battery having enhanced performance and lifetime by resolving problems caused by lithium metal reactivity, and problems occurring during an assembly process.

Technical Solution

In order to achieve the above object, the present invention provides a lithium secondary battery comprising a positive electrode, a negative electrode comprising a negative electrode current collector; and an electrolyte disposed between the positive electrode and the negative electrode; and
  a lithium metal layer on the negative electrode current collector in the negative electrode,
  wherein the electrolyte comprises a first electrolyte layer and a second electrolyte disposed on the first electrolyte layer,
  wherein the first electrolyte layer faces the negative electrode, and the second electrolyte layer faces the positive electrode,
  wherein the first electrolyte layer has higher ion conductivity than the second electrolyte layer, and
  wherein the lithium metal layer is formed by migration of lithium ions migrate from the positive electrode after charging.

Advantageous Effects

A lithium secondary battery according to the present invention is coated while being blocked from the atmosphere through a process of forming a lithium metal layer on a negative electrode current collector, and therefore, is capable of suppressing formation of a surface oxide layer on the lithium metal caused by oxygen and moisture in the atmosphere, and as a result, an effect of enhancing cycle lifetime properties is obtained.

In addition, by including two or more electrolyte layers having different ion conductivity, an effect of significantly suppressing dendrite growth by a difference in the ion conductivity is obtained.

DESCRIPTION OF DRAWINGS

FIG. 1 is a mimetic diagram of a lithium secondary battery manufactured according to the present invention.

FIG. 2 is a mimetic diagram after completing initial charge on the lithium secondary battery manufactured according to the present invention.

FIG. 3 schematically illustrates a structure and a mechanism of an existing lithium secondary battery.

FIG. 4 schematically illustrates a structure and a mechanism of the lithium secondary battery of the present invention.

BEST MODE

Hereinafter, the present invention will be described in more detail.

In the drawings, parts not relevant to the descriptions are not included in order to clearly describe the present invention, and like reference numerals are used for like elements throughout the specification. In addition, sizes and relative sizes of constituents presented in the drawings are unrelated to actual scales, and may be reduced or exaggerated for clarity of the descriptions.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

In the present specification, a mention of a layer being "on" another layer or substrate may be being directly formed on another layer or substrate, or having a third layer provided therebetween. In addition, a directional expression such as an upper direction, an upper (part) or an upper surface in the present specification may be understood as a meaning of a lower direction, a lower (part), a lower surface or the like based on the criteria. In other words, an expression of spatial direction needs to be understood as a relative direction and needs not to be limitedly interpreted to mean an absolute direction.

In addition, terms such as "include", "contain" or "have" are to specify the presence of features, numbers, constituents or combinations thereof described in the specification, and need to be construed as not excluding the possibility of presence or addition of one or more of other features, numbers, constituents or combinations thereof.

In the drawings, thicknesses of layers and regions may be exaggerated or skipped for clarity, and the same reference numerals represent the same constituents throughout the specification In addition, in describing the present invention hereinafter, when specific descriptions on related known functions or constitutions are considered to unnecessarily obscure the gist of the present invention, the detailed descriptions will not be presented.

The present invention relates to a lithium secondary battery comprising a positive electrode, a negative electrode and an electrolyte,
  wherein the electrolyte comprises a first electrolyte layer facing the negative electrode, and a second electrolyte layer disposed on the first electrolyte layer and facing the positive electrode,
  the first electrolyte layer has higher ion conductivity than the second electrolyte layer, and
  lithium ions migrate from the positive electrode by charge to form lithium metal on a negative electrode current collector in the negative electrode.

FIG. 1 is a sectional diagram of a lithium secondary battery manufactured according to a first embodiment of the present invention, and is provided with a positive electrode including a positive electrode current collector 11 and a positive electrode mixture 13; a negative electrode current collector 21; a first electrolyte layer 31 facing the negative electrode; and a second electrolyte layer 33 disposed on the first electrolyte layer and facing the positive electrode.

In a common negative electrode of a lithium secondary battery, a negative electrode is formed on a negative electrode current collector 21, however, in the present invention, only a negative electrode current collector 21, a first electrolyte layer 31 and a second electrolyte layer 33 are used to assemble a negative electrode free battery structure, and then, lithium ions deintercalated from a positive electrode mixture 13 by charge form a lithium metal layer (not shown) between the negative electrode current collector 21 and the first electrolyte layer 31 as a negative electrode mixture, and as a result, a negative electrode having a known constitution of a negative electrode current collector/negative electrode mixture is formed to obtain a constitution of a common lithium secondary battery.

More specifically, the lithium metal layer may be formed in the first electrolyte layer 31 formed on the negative electrode current collector 21.

In other words, in the present invention, a lithium secondary battery is a concept including both a battery that is negative electrode free in which a negative electrode is not formed on a negative electrode current collector when initially assembling the battery, or a battery that may have a negative electrode by having a negative electrode formed on a negative electrode current collector according to use.

In addition, in the negative electrode of the present invention, a form of lithium metal formed as a negative electrode mixture on a negative electrode current collector includes both a form in which lithium metal is formed in a layer, and a porous structure in which lithium metal is not formed in a layer (for example, a structure in which lithium metal aggregates in a particle form).

Hereinafter, the present invention will be described based on a lithium metal layer 23 form in which lithium metal is formed in a layer, however, it is clear that such a description does not exclude a structure in which lithium metal is not formed in a layer.

FIG. 2 is a mimetic diagram after completing initial charge on the lithium secondary battery manufactured according to the first embodiment of the present invention.

According to FIG. 2, when a lithium secondary battery having a negative electrode free battery structure is charged by applying a voltage of a certain level or higher, lithium ions are released from a positive electrode mixture 13 in a positive electrode 10, and these ions migrate toward a negative electrode current collector 21 side after passing through a second electrolyte layer 33 and a first electrolyte layer 31, and form a lithium metal layer 23 formed purely with lithium on the negative electrode current collector 21 to form a negative electrode 20.

Such lithium metal layer 23 formation through charge has advantages of very readily adjusting interfacial properties when compared to an existing negative electrode obtained by sputtering a lithium metal layer 23 on a negative electrode current collector 21 or laminating lithium foil and a negative electrode current collector 21.

Particularly, lithium metal is not exposed to the atmosphere at all during a battery assembling process by being formed to a negative electrode free battery structure, which fundamentally blocks existing problems such as formation of an oxide layer on the surface caused by high reactivity of the lithium itself and a decrease in the lifetime of a lithium secondary battery resulting therefrom.

In the negative electrode free battery structure of the present invention, the negative electrode current collector forming the negative electrode is generally made to a thickness of 3 μm to 50 μm.

The negative electrode current collector 21 capable of forming a lithium metal layer 23 through charge is not particularly limited as long as it has conductivity without inducing chemical changes to a lithium secondary battery.

As an example, copper, stainless steel, aluminum, nickel, titanium, baked carbon, copper or stainless steel of which surface is treated with carbon, nickel, titanium, silver and the like, aluminum-cadmium alloys and the like may be used.

Herein, the negative electrode current collector 21 may be used in various forms such as films having micro-unevenness formed on the surface, sheets, foil, nets, porous bodies, foams and non-woven fabrics.

The electrolyte of the lithium secondary battery according to the present invention includes a first electrolyte layer and a second electrolyte layer. The first electrolyte layer faces the negative electrode, the second electrolyte layer is disposed on the first electrolyte layer, and the second electrolyte layer faces the positive electrode.

In addition, the first electrolyte layer has higher ion conductivity than the second electrolyte layer.

In the electrolyte of the present invention, the first electrolyte layer may have ion conductivity of $10^{-5}$ S/cm to $10^{-2}$ S/cm, and the second electrolyte layer may have ion conductivity of $10^{-6}$ S/cm to $10^{-3}$ S/cm.

In addition, a difference in the ion conductivity between the first electrolyte layer and second electrolyte layer may be from 2 times to $10^4$ times, and more preferably from 10 times to 100 times.

When the difference in the ion conductivity is less than the lower limit of the above-mentioned range, an effect of suppressing lithium dendrite growth becomes insignificant, and the difference being greater than the upper limit is not preferred since battery driving efficiency decreases.

In addition, the first electrolyte layer of the present invention has lower strength than the second electrolyte layer. The first electrolyte layer may have strength of $10^5$ Pa or less, and the second electrolyte layer may have strength of greater than $10^5$ Pa. Preferably, the first electrolyte layer may have strength of 10 Pa to $10^4$ Pa, and the second electrolyte layer may have strength of $10^6$ Pa to $10^{10}$ Pa.

A lithium secondary battery using lithium metal or a material including lithium metal as a negative electrode for a lithium secondary battery generally goes through rapid degradation due to, first, lithium dendrite growth, reactivity of lithium with an electrolyte liquid, and other side reactions. Second, when forming a protective layer on the negative electrode surface to resolve the above-described problems and defects are generated in the protective layer, lithium dendrite growth is accelerated in the defect-generated portion resulting in a battery short circuit.

As a result of extensive studies to resolve such problems, the inventors of the present invention have discovered that, when a first electrolyte layer has higher ion conductivity than a second electrolyte layer, lithium ions are not concentrated on the defect site even when defects are generated in the first electrolyte layer (FIG. 3), and lithium is plated through the first electrolyte layer around the defect-generated portion having higher ion conductivity (FIG. 4) preventing rapid growth of lithium dendrite, and have completed the present invention.

Therefore, in the electrolyte of the lithium secondary battery of the present invention, the first electrolyte layer (or protective layer) facing the negative electrode has higher ion conductivity than the second electrolyte layer.

The protective layer needs to satisfy a condition of no current flowing while allowing lithium ion migration, and therefore, may be understood as an electrolyte layer. Accordingly, the first electrolyte layer is defined to have a function of a protective layer as well in the present invention.

In the electrolyte of the present invention, one or more of the first electrolyte layer and the second electrolyte layer are either a semisolid electrolyte or a solid electrolyte. This is due to the fact that the first electrolyte layer and the second electrolyte layer are mixed when both of these are a liquid making it difficult to obtain target effects in the present invention.

In the electrolyte of the present invention, the first electrolyte layer may have a thickness of 0.1 μm to 20 μm, and preferably 0.1 μm to 10 μm. When the thickness is less than 0.1 μm, the function as a protective layer may not be fulfilled, and when the thickness is greater than 20 μm, interfacial resistance increases causing decline in the battery properties.

In addition, the second electrolyte layer may have a thickness of 0.1 μm to 50 μm, and preferably 0.1 μm to 30 μm. When the thickness is less than 0.1 μm, the function as an electrolyte may not be fulfilled, and when the thickness is greater than 50 μm, interfacial resistance increases causing decline in the battery properties.

In the electrolyte of the present invention, the electrolyte may further include at least one additional electrolyte layer formed on the second electrolyte layer facing the positive electrode. In this case, ion conductivity of the at least one additional electrolyte layer may be higher than the first electrolyte layer, and when the ion conductivity is higher, driving performance of a battery may be further enhanced. This is due to the fact that the goal of the present invention may be accomplished from the ion conductivity relation between the first electrolyte layer and the second electrolyte layer.

In the electrolyte of the present invention, the electrolyte layer facing the positive electrode of the at least one additional electrolyte layer formed on the second electrolyte layer may have higher ion conductivity than the second electrolyte layer.

When the electrolyte layer facing the positive electrode has high ion conductivity, conduction of Li ions inserted and released from the positive electrode is rapid decreasing resistance during charge and discharge, and as a result, driving performance of a battery may be further enhanced such as enhancing rate properties of the battery.

In the electrolyte of the present invention, the electrolyte layer facing the positive electrode of the at least one additional electrolyte layer formed on the second electrolyte layer may have ion conductivity of $10^{-5}$ S/cm to $10^{-2}$ S/cm, and more preferably $10^{-4}$ S/cm to $10^{-2}$ S/cm.

In one embodiment of the present invention, the at least one additional electrolyte layer formed on the second electrolyte layer is a third electrolyte layer, and this electrolyte layer may have a form facing the positive electrode.

The electrolyte of the present invention may have a separator provided between the electrolytes. In addition, the separator may be provided in a form of being impregnated into the electrolyte in this case.

In one embodiment of the present invention, the separator may be formed on the second electrolyte layer. However, the structure is not limited such a form.

In the electrolyte of the present invention, the first electrolyte layer is preferably formed with a semisolid electrolyte or a solid electrolyte considering a function as a protective layer. As the semisolid electrolyte and the solid electrolyte, those known in the art may be used without limit as long as they satisfy the ion conductivity condition limited above.

In the electrolyte of the present invention, the second electrolyte layer may be formed to a liquid electrolyte, a semisolid electrolyte or a solid electrolyte. As the liquid electrolyte, the semisolid electrolyte and the solid electrolyte, electrolytes known in the art may be used without limit as long as they satisfy the ion conductivity condition limited above.

The liquid electrolyte, the semisolid electrolyte and the solid electrolyte may, for example, have forms as follows, however, the form is not limited thereto.

A lithium salt-containing non-aqueous electrolyte is formed with a lithium salt and an electrolyte liquid, and as the electrolyte liquid, non-aqueous organic solvents, organic solid electrolytes, inorganic solid electrolytes and the like are used.

Examples of the lithium salt of the present invention may include, as a material favorably dissolved in a non-aqueous organic solvent, may include one or more selected from the group consisting of $LiNO_3$, LiSCN, LiCl, LiBr, LiI, $LiPF_6$, $LiBF_4$, $LiSbF_6$, $LiAsF_6$, $LiB_{10}Cl_{10}$, $LiCH_3SO_3$, $LiCF_3SO_3$, $LiCF_3CO_2$, $LiClO_4$, $LiAlCl_4$, $Li(Ph)_4$, $LiC(CF_3SO_2)_3$, $LiN(FSO_2)_2$, $LiN(CF_3SO_2)_2$, $LiN(C_2F_5SO_2)_2$, $LiN(SFO_2)_2$, $LiN(CF_3CF_2SO_2)_2$, chloroborane lithium, lower aliphatic carboxylic acid lithium, lithium tetraphenylborate, lithium imide and combinations thereof.

The concentration of the lithium salt may be from 0.2 M to 3 M, specifically from 0.6 M to 2 M and more specifically from 0.7 M to 1.7 M depending on various factors such as an accurate composition of the electrolyte mixture, solubility of the salt, conductivity of the dissolved salt, charge and discharge conditions of a battery, a working temperature, and other factors known in the lithium battery field. When used in less than 0.2 M, conductivity of the electrolyte may decrease causing decline in the electrolyte performance, and when used in greater than 3 M, viscosity of the electrolyte increases leading to a decrease in the lithium ion ($Li^+$) mobility.

The non-aqueous organic solvent needs to favorably dissolve the lithium salt, and examples of such a non-aqueous organic solvent may include aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyl tetrahydrofuran, dimethyl sulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate, and the organic solvent may be used either alone or as a mixture of two or more organic solvents.

As the organic solid electrolyte, for example, polyethylene derivatives, polyethylene oxide derivatives, polypropylene oxide derivatives, phosphoric acid ester polymers, polyagitation lysine, polyester sulfide, polyvinyl alcohol, polyvinylidene fluoride, polymers including an ionic dissociation group, and the like may be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH or $Li_3PO_4$—$Li_2S$—$SiS_2$ may be used.

With the purpose of improving charge and discharge properties and flame retardancy, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added to the electrolyte of the present invention. In some cases, halogen-containing solvents such as carbon tetrachloride and trifluoroethylene may be further included in order to provide nonflammability, carbon dioxide gas may be further included in order to enhance high temperature storage properties, and fluoro-ethylene carbonate (FEC), propene sultone (PRS), fluoro-propylene carbonate (FPC) and the like may be further included.

Meanwhile, the positive electrode mixture 13, various positive electrode active materials may be used depending on the battery type, and the positive electrode active material used in the present invention is not particularly limited as long as it is a material capable of intercalating or deintercalating lithium ions, however, a lithium transition metal oxide is typically used currently as a positive electrode active material capable of obtaining a battery having excellent lifetime properties and charge and discharge efficiency.

As the lithium transition metal oxide, layer compounds such as lithium cobalt oxide ($LiCoO_2$) or lithium nickel oxide ($LiNiO_2$) including two or more transition metals, and for example, substituted with one or more transition metals; lithium manganese oxide substituted with one or more transition metals; lithium nickel-based oxides; spinel-based lithium nickel manganese composite oxides; spinel-based lithium manganese oxides in which some of Li of the chemical formula are substituted with alkaline-earth metals; olivine-based lithium metal phosphates; and the like may be included, however, the lithium transition metal oxide is not limited thereto.

Preferably, a lithium transition metal oxide is used, and for example, one or more types selected from the group consisting of $LiCoO_2$, $LiNiO_2$, $LiMnO_2$, $LiMn_2O_4$, $Li_2NiO_2$, $Li(Ni_aCo_bMn_c)O_2$ ($0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (herein, $0 \leq Y<1$), $Li(Ni_aCo_bMn_c)O_4$ ($0<a<2$, $0<b<2$, $0<c<2$, and $a+b+c=2$), $LiMn_{2-z}Ni_zO_4$, $LiMn_{2-z}Co_zO_4$ (herein, $0<Z<2$), $Li_xM_yMn_{2-y}O_{4-z}A_z$ (herein, $0.9 \leq x \leq 1.2$, $0<y<2$, $0 \leq z<0.2$, M=one or more of Al, Mg, Ni, Co, Fe, Cr, V, Ti, Cu, B, Ca, Zn, Zr, Nb, Mo, Sr, Sb, W, Ti and Bi, and A is one or more anions of −1 or −2 valency), $Li_{1+a}Ni_bM'_{1-b}O_{2-c}A'_c$ (herein, $0 \leq a \leq 0.1$, $0 \leq b \leq 0.8$, $0 \leq c<0.2$, M' is one or more types selected from the group consisting of octahedral stable elements such as Mn, Co, Mg or Al, and A' is one or more anions of −1 or −2 valency), $LiCoPO_4$ and $LiFePO_4$ may be used, and most preferably, $LiCoO_2$ is used. In addition to such oxides, sulfides, selenides, halides and the like may also be used.

The lithium transition metal oxide is used in the positive electrode mixture 13 as a positive electrode active material together with a binder, a conductor and the like. In the negative electrode free battery structure of the present invention, a lithium source for forming the lithium metal layer 23 becomes the lithium transition metal oxide. In other words, when conducting charging in a specific voltage range, lithium ions in the lithium transition metal oxide are released forming the lithium metal layer 23 on the negative electrode current collector 21.

However, since lithium ions in the lithium transition metal oxide are not readily released by itself or there is no lithium to involve other than charge and discharge at the above-mentioned operating voltage level, the lithium metal layer 23 is very difficult to form, and when using only a lithium transition metal oxide, irreversible capacity greatly decreases causing a problem of declining capacity and lifetime properties of a lithium secondary battery.

In view of the above, a lithium metal compound that is a highly irreversible material having initial charge capacity of 200 mAh/g or initial irreversibility of 30% or greater when conducting one-time charge at 0.01 C to 0.2 C in a voltage range of 4.5 V to 2.5 V is used together as an additive capable of providing a lithium source to the lithium transition metal oxide in the present invention.

The term 'highly irreversible material' mentioned in the present invention may be used in the same manner as 'large capacity irreversible material' in another term, and this means a material having a high irreversible capacity ratio of a first charge and discharge cycle, that is, high "(first cycle charge capacity-first cycle discharge capacity)/first cycle charge capacity". In other words, a highly irreversible material may irreversibly provide an excess amount of lithium ions during a first charge and discharge cycle. For example, among lithium transition metal compounds capable of intercalating and deintercalating lithium ions, a positive electrode material having large irreversible capacity of a first charge and discharge cycle (first cycle charge capacity-first cycle discharge capacity) may be considered.

Irreversible capacity of a generally used positive electrode active material is approximately from 2% to 10% with respect to initial charge capacity, but in the present invention, a lithium metal compound that is a highly irreversible material, that is, a lithium metal compound having initial irreversibility of 30% or greater and preferably 50% or greater of the initial charge capacity may be used together. In addition, as the lithium metal compound, materials having initial charge capacity of 200 mAh/g or greater, and preferably 230 mAh/g or greater may be used. Using such a lithium metal compound performs a role of a lithium source capable of forming the lithium metal layer 23 while increasing irreversible capacity of the lithium transition metal oxide that is the positive electrode active material.

As the lithium metal compound provided in the present invention, compounds represented by the following Chemical Formula 1 to Chemical Formula 8 may be used.

$$Li_2Ni_{1-a}M^1_aO_2 \quad \text{[Chemical Formula 1]}$$

(in the formula, a is 0≤a<1, and $M^1$ is an element of one or more types selected from the group consisting of Mn, Fe, Co, Cu, Zn, Mg and Cd), $$Li_{2+b}Ni_{1-c}M^2_cO_{2+d} \quad \text{[Chemical Formula 2]}$$

(in the formula, −0.5≤b≤0.5, 0≤c≤1, 0≤d<0.3, and $M^2$ is an element of one or more types selected from the group consisting of P, B, C, Al, Sc, Sr, Ti, V, Zr, Mn, Fe, Co, Cu, Zn, Cr, Mg, Nb, Mo and Cd), $$LiM^3_eMn_{1-e}O_2 \quad \text{[Chemical Formula 3]}$$

(in the formula, 0≤e<0.5, and $M^3$ is an element of one or more types selected from the group consisting of Cr, Al, Ni, Mn and Co), $$Li_2M^4O_2 \quad \text{[Chemical Formula 4]}$$

(in the formula, $M^4$ is an element of one or more types selected from the group consisting of Cu and Ni), $$Li_{3+f}Nb_{1-g}M^5_gS_{4-h} \quad \text{[Chemical Formula 5]}$$

(in the formula, −0.1≤f≤1, 0≤g≤0.5, and $M^5$ is an element of one or more types selected from the group consisting of Mn, Fe, Co, Cu, Zn, Mg and Cd), $$LiM^6_iMn_{1-i}O_2 \quad \text{[Chemical Formula 6]}$$

(in the formula, i is 0.05≤i<0.5, and $M^6$ is an element of one or more types selected from the group consisting of Cr, Al, Ni, Mn and Co), $$LiM^7_{2j}Mn_{2-2j}O_4 \quad \text{[Chemical Formula 7]}$$

(in the formula, j is 0.05≤j<0.5, and $M^7$ is an element of one or more types selected from the group consisting of Cr, Al, Ni, Mn and Co), and $$Li_k\text{-}M^8_m\text{-}N_n \quad \text{[Chemical Formula 8]}$$

(in the formula, $M^8$ represents an alkaline-earth metal, k/(k+m+n) is from 0.10 to 0.40, m/(k+m+n) is from 0.20 to 0.50, and n/(k+m+n) is from 0.20 to 0.50).

The lithium metal compounds of Chemical Formula 1 to Chemical Formula 8 have differences in the irreversible capacity depending on the structure. These may be used either alone or as a mixture, and perform a role of increasing irreversible capacity of the positive electrode active material.

As one example, the highly irreversible materials represented by Chemical Formula 1 and Chemical Formula 3 have different irreversible capacity depending on the type, and as one example, have values as listed in the following Table 1.

TABLE 1

|  | Initial Charge Capacity (mAh/g) | Initial Discharge Capacity (mAh/g) | Initial Coulombic Efficiency | Initial Irreversible Capacity Ratio |
|---|---|---|---|---|
| [Chemical Formula 1] $Li_2NiO_2$ | 370 | 110 | 29.7% | 70.3% |
| [Chemical Formula 3] $LiMnO_2$ | 230 | 100 | 43.5% | 56.5% |
| [Chemical Formula 3] $LiCr_eMn_{1-e}O_2$ | 230 | 80 | 34.8% | 65.2% |

In addition, the lithium metal compound of Chemical Formula 2 preferably belongs to the space group Immm, and in the group, Ni and M composite oxide forming a planar tetrahedron (Ni, M)$O_4$ with the planar tetrahedral structure forming a primary chain while sharing a facing side (side formed with O—O) is more preferred. The compound of Chemical Formula 2 preferably has a crystal lattice constant of a=3.7±0.5 Å, b=2.8±0.5 Å, c=9.2±0.5 Å, α=90°, β=90° and γ=90°.

In addition, in the lithium metal compound of Chemical Formula 8, the content of the alkaline-earth metal is from 30 atomic % to 45 atomic %, and the content of the nitrogen is from 30 atomic % to 45 atomic %. Herein, when the alkaline-earth metal content and the nitrogen content are in the above-mentioned ranges, the compound of Chemical Formula 8 has excellent thermal properties and lithium ion conducting properties. In Chemical Formula 8, k/(k+m+n) is from 0.15 to 0.35 and, for example, from 0.2 to 0.33, m/(k+m+n) is from 0.30 to 0.45 and, for example, from 0.31 to 0.33, and n/(k+m+n) is from 0.30 to 0.45 and, for example, from 0.31 to 0.33.

In the electrode active material of the chemical formula 1, a is from 0.5 to 1, b is 1, and c is 1 according to one embodiment.

A surface of the positive electrode active material may have a core-shell structure coated with any one of the compounds of Chemical Formula 1 to Chemical Formula 8.

When forming a coating layer formed with any one of the compounds of Chemical Formula 1 to Chemical Formula 8 on the core active material surface, the electrode active material exhibits stable properties while maintaining low resistance properties even under an environment of lithium ions being continuously inserted and released.

In the electrode active material according to an embodiment of the present invention, the coating layer has a thickness of 1 nm to 100 nm. When the thickness of the coating layer is in the above-mentioned range, ion conducting properties of the electrode active material are superior.

The electrode active material has an average particle diameter of 1 μm to 30 μm, and according to one embodiment, 8 μm to 12 μm. When the average particle diameter of the positive electrode active material is in the above-mentioned range, battery capacity properties are superior.

Examples of the alkaline-earth metal-doped core active material may include magnesium-doped $LiCoO_2$. The magnesium content is from 0.01 parts by weight to 3 parts by weight based on 100 parts by weight of the core active material.

The lithium transition metal oxide is used in the positive electrode mixture 13 as a positive electrode active material together with a binder, a conductor and the like. In the structure of the negative electrode free battery of the present invention, a lithium source for forming the lithium metal layer 23 becomes the lithium transition metal oxide. In other words, lithium ions in the lithium transition metal oxide are released when conducting charge in a specific voltage range to form the lithium metal layer 23 on the negative electrode current collector 21.

In the present invention, as for the charging range for forming the lithium metal layer 23, the charging is conducted once at 0.01 C to 0.2 C in a voltage range of 4.5 V to 2.5 V. When the charging is conducted at a voltage level of less than the above-mentioned range, the lithium metal layer 23 is difficult to form, and when the voltage level is greater than the above-mentioned range on the contrary, the battery (cell) is damaged, and charge and discharge are not properly progressed after over-discharge occurs.

The lithium metal layer 23 formed above forms a uniform continuous or discontinuous layer on the negative electrode current collector 21. As one example, when the negative electrode current collector 21 has a foil form, a continuous thin-film form may be obtained, and when the negative electrode current collector 21 has a three-dimensional porous structure, the lithium metal layer 23 may be discontinuously formed. In other words, the discontinuous layer means a form of being discontinuously distributed having, in a specific region, a region having the lithium metal layer 23 and a region not having the lithium metal layer 23 present, and by the region not having lithium metal 23 being distributed to isolate, disconnect or separate the region having the lithium compound as an island-type, the region having the lithium metal layer 23 is distributed without continuity.

The lithium metal layer 23 formed through such charge and discharge has a thickness of a minimum of 50 nm or greater, 100 μm or less, and preferably 1 μm to 50 μm to function as a negative electrode. When the thickness is less than the above-mentioned range, battery charge and discharge efficiency rapidly decrease. When the thickness is greater than the above-mentioned range on the contrary, lifetime properties and the like are stable, however, there is a problem in that battery energy density decreases.

Particularly, by being manufactured to a negative electrode free battery with no lithium metal when assembling a battery, the lithium metal layer 23 provided in the present invention has no or little oxide layer formed thereon caused by high reactivity of the lithium generated during the assembling process, compared to an existing lithium secondary battery assembled using lithium foil. As a result, a lifetime degradation of a battery caused by the oxide layer may be prevented.

In addition, the lithium metal layer 23 moves by charge of the highly irreversible material, and this may form a more stable lithium metal layer 23 compared to forming a lithium metal layer 23 on a positive electrode. When attaching lithium metal on a positive electrode, a chemical reaction between the positive electrode and the lithium metal may occur.

The positive electrode mixture 13 is formed including the positive electrode active material and the lithium metal compound, and herein, the positive electrode mixture 13 may further include a conductor, a binder, and other additives commonly used in a lithium secondary battery.

The conductor is used for further enhancing conductivity of the electrode active material. Such a conductor is not particularly limited as long as it has conductivity without inducing chemical changes to the corresponding battery, and for example, graphite such as natural graphite or artificial graphite; carbon black such as carbon black, acetylene black, ketjen black, channel black, furnace black, lamp black and thermal black; conductive fibers such as carbon fiber or metal fiber; fluorocarbon; metal powders such as aluminum and nickel powder; conductive whiskers such as zinc oxide and potassium titanate; conductive metal oxides such as titanium oxide; polyphenylene derivatives, and the like may be used.

The binder may be further included for binding of the positive electrode active material, the lithium metal compound and the conductor, and binding for the current collector. The binder may include a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoroalkyl vinyl ether copolymer, a fluorovinylidene-hexafluoropropylene copolymer, a fluorovinylidene-chlorotrifluoroethylene copolymer, an ethylene-tetrafluoroethylene copolymer, polychlorotrifluoroethylene, a fluorovinylidene-pentafluoropropylene copolymer, a propylene-tetrafluoroethylene copolymer, an ethylene-chlorotrifluoroethylene copolymer, a fluorovinylidene-hexafluoropropylene-tetrafluoroethylene copolymer, a fluorovinylidene-perfluoromethyl vinyl ether-tetrafluoroethylene copolymer, an ethylene-acrylic acid copolymer and the like may be used either alone or as a mixture, however, the binder is not limited thereto, and those that may be used as a binder in the art may all be used.

Examples of the other additives may include a filler. The filler is selectively used as a component suppressing electrode expansion, and is not particularly limited as long as it is a fibrous material without inducing chemical changes to the corresponding battery. For example, olefin-based polymers such as polyethylene or polypropylene, or fibrous materials such as glass fiber or carbon fiber may be used.

The positive electrode mixture 13 of the present invention is formed on the positive electrode current collector 11.

The positive electrode current collector is generally prepared to a thickness of 3 µm to 500 µm. Such a positive electrode current collector 11 is not particularly limited as long as it has high conductivity without inducing chemical changes to a lithium secondary battery, and for example, stainless steel, aluminum, nickel, titanium, baked carbon, or aluminum or stainless steel of which surface is treated with carbon, nickel, titanium, silver or the like, and the like may be used.

Herein, in order to increase adhesive strength with the positive electrode active material, the positive electrode current collector 11 may be used in various forms such as films, sheets, foil, nets, porous bodies, foams or non-woven fabrics having micro unevenness formed on the surface.

The method of coating the positive electrode mixture 13 on the current collector may include a method of distributing electrode mixture slurry on the current collector and uniformly dispersing the result using a doctor blade and the like, a method of die casting, comma coating, screen printing, and the like. In addition, the electrode mixture slurry may be bonded to the current collector using a method of pressing or lamination after being molded on a separate substrate, however, the method is not limited thereto.

The separator used in the lithium secondary battery of the present invention separates or insulates the positive electrode and the negative electrode from each other, and enables lithium ion transfer between the positive electrode and the negative electrode, and may be formed with porous non-conductive or insulating materials. As an insulator having high ion permeability and mechanical strength, such a separator may be an independent member such as a thin film or a film, or a coating layer added to the positive electrode and/or the negative electrode. In addition, when using a solid electrolyte such as a polymer as the electrolyte, the solid electrolyte may also be used as the separator.

The separator preferably has a pore diameter of generally 0.01 µm to 10 µm and a thickness of generally 5 µm to 300 µm, and as such a separator, a glass electrolyte, a polymer electrolyte, a ceramic electrolyte or the like may be used. For example, olefin-based polymers having chemical resistance and hydrophobicity such as polypropylene, glass fiber, or sheets, non-woven fabrics, kraft papers and the like made of polyethylene and the like are used. Typical examples commercially available may include Celgard series (Celgard® 2400, 2300, product of Hoechst Celanese Corp.), polypropylene separator (product of Ube Industries Ltd. or product of Pall RAI), polyethylene series (Tonen or Entek) and the like.

The electrolyte separator in a solid state may include a non-aqueous organic solvent in approximately less than 20% by weight, and in this case, a proper gelling agent may be further included in order to reduce fluidity of the organic solvent. Typical examples of such a gelling agent may include polyethylene oxide, polyvinylidene fluoride, polyacrylonitrile and the like.

Manufacture of the lithium secondary battery having the constitution as described above is not particularly limited in the present invention, and the lithium secondary battery may be manufactured using known methods.

In an all-solid-state battery type as one example, the electrolyte of the present invention is disposed between a positive electrode and a negative electrode, and the result is compression molded to assemble a cell.

The assembled cell is installed in an exterior material, and then sealed by heating compression and the like. As the exterior material, a laminate pack of aluminum, stainless and the like, or a cylindrical or prismatic metal-based container may be properly used.

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also fall within the scope of the attached claims.

<Manufacture of Negative Electrode Free Lithium Secondary Battery>

EXAMPLE 1

LCO ($LiCoO_2$) and $L_2N$($Li_2NiO_2$) mixed in a weight ratio of 9:1 in N-methyl-2-pyrrolidone was used as a positive electrode active material, and after mixing the positive electrode active material:conductor (super-P):binder (PVdF) in a weight ratio of 95:2.5:2.5, the result was mixed for 30 minutes using a paste face mixer to prepare a slurry composition.

The slurry composition prepared above was coated on a current collector (Al Foil, thickness 20 µm), and dried for 12 hours at 130° C. to prepare a positive electrode having a loading amount of 3 mAh/cm².

A first electrolyte was prepared by mixing LiFSI (2.8 M) with dimethyl carbonate (DMC), and this was injected to a copper current collector, that is, a negative electrode side, to use as a first electrolyte layer.

Poly(ethylene glycol) methyl ether acrylate (PEGMEA), poly(ethylene glycol) diacrylate (PEGDA), succinonitrile (SN) and LiTFSI were mixed in a weight ratio of 15:5:40:40 to prepare a second electrolyte, and this was impregnated into a separator with 48.8% porosity to form a second electrolyte layer. The second electrolyte layer was provided between the first electrolyte layer and a third electrolyte layer.

A third electrolyte was prepared by dissolving 1 M of $LiPF_6$ and 2% by weight of vinylene carbonate (VC) in a mixed solvent mixing ethylene carbonate (EC), diethyl carbonate (DEC) and dimethyl carbonate (DMC) in a volume ratio of 1:2:1, and this was injected to the positive electrode side to form the third electrolyte layer.

The positive electrode prepared above was disposed on the third electrolyte layer to manufacture a negative electrode free lithium secondary battery of Example 1.

EXAMPLE 2

A negative electrode free lithium secondary battery of Example 2 was manufactured in the same manner as in Example 1 except that $L_2N(Li_2NiO_2)$ was not used as the positive electrode active material.

COMPARATIVE EXAMPLE 1

LCO ($LiCoO_2$) and $L_2N(Li_2NiO_2)$ mixed in a weight ratio of 9:1 in N-methyl-2-pyrrolidone was used as a positive electrode active material, and after mixing the positive electrode active material:conductor (super-P):binder (PVdF) in a weight ratio of 95:2.5:2.5, the result was mixed for 30 minutes using a paste face mixer to prepare a slurry composition.

The slurry composition prepared above was coated on a current collector (Al Foil, thickness 20 μm), and dried for 12 hours at 130° C. to prepare a positive electrode.

An electrolyte was prepared by dissolving 1 M of $LiPF_6$ and 2% by weight of vinylene carbonate (VC) in a mixed solvent mixing ethylene carbonate (EC), diethyl carbonate (DEC) and dimethyl carbonate (DMC) in a volume ratio of 1:2:1, and this was injected to a separator with 48.8% porosity to be provided between the positive electrode and a negative electrode.

The positive electrode prepared above was disposed on the separator to manufacture a negative electrode free lithium secondary battery of Comparative Example 1.

EXPERIMENTAL EXAMPLE 1. MEASUREMENT OF ION CONDUCTIVITY OF ELECTROLYTE LAYER

Ion conductivity of each of Example 1 and Comparative Example 1 was measured. Ion conductivity of the first electrolyte layer and ion conductivity of the third electrolyte layer of Example 1 were measured using a Mettler Toledo conductivity meter, and ion conductivity of the second electrolyte layer of Example 1 was measured using a SUS/SUS cell. In addition, ion conductivity of the electrolyte layer of Comparative Example 1 was measured using a Mettler Toledo conductivity meter.

The results are shown in the following Table 2.

TABLE 2

|  |  | Example 1 | Comparative Example 1 |
|---|---|---|---|
| First Layer | Electrolyte | $10 \times 10^{-3}$ S/cm | $8 \times 10^{-3}$ S/cm |
| Second Layer | Electrolyte | $2 \times 10^{-4}$ S/cm |  |
| Third Layer | Electrolyte | $8 \times 10^{-3}$ S/cm |  |

EXPERIMENTAL EXAMPLE 2. ANALYSIS ON PROPERTIES OF LITHIUM SECONDARY BATTERY

Each of the negative electrode free lithium secondary batteries manufactured in Example 1, Example 2 and Comparative Example 1 was charged once at 0.1 C and 4.25 V of CC/CV (5% current cut at 1 C) to manufacture a lithium metal layer-formed lithium secondary battery.

Each of the lithium secondary batteries was charged and discharged under a condition of 0.2 C/0.5 C based on discharge of 3 mAh/cm², and the number of cycles of the lithium metal layer (23)—formed lithium secondary battery when a capacity retention rate was 50% or greater with respect to initial discharge capacity was measured. The results are shown in the following Table 3.

TABLE 3

|  | Use of $L_2N$ | Time of Short Occurrence | Number of Cycles When Capacity Retention Rate Was 50% or Greater with Respect to Initial Discharge Capacity |
|---|---|---|---|
| Example 1 | ○ | — | 17 |
| Example 2 | X | — | 10 |
| Comparative Example 1 | ○ | 2 cycles | Stopped Due to Short Occurrence |

From the results of Table 3, a short did not occur and the number of cycles when a capacity retention rate was 50% or greater with respect to initial discharge capacity was measured to be the highest of 17 cycles in Example 1 using $L_2N$, a highly irreversible material. In Example 2, the number of cycles was measured to be lower than Example 1 since $L_2N$, a highly irreversible material, was not used. On the other hand, Comparative Example 1 included only one electrolyte layer, and a short occurred at the $2^{nd}$ cycle, and a capacity retention rate was not able to be measured, and very unstable charge and discharge properties were obtained.

REFERENCE NUMERAL

11: Positive Electrode Current Collector
13: Positive Electrode Mixture
20: Negative Electrode
21: Negative Electrode Current Collector
23: Lithium Metal Layer
31: First Electrolyte Layer
33: Second Electrolyte Layer

The invention claimed is:

1. A lithium secondary battery comprising:
a positive electrode;
a negative electrode comprising a negative electrode current collector;
an electrolyte disposed between the positive electrode and the negative electrode; and
a lithium metal layer on the negative electrode current collector in the negative electrode,
wherein the electrolyte comprises a first electrolyte layer and a second electrolyte layer disposed on the first electrolyte layer,
wherein the first electrolyte layer faces the negative electrode, and the second electrolyte layer faces the positive electrode;
wherein the first electrolyte layer has higher ion conductivity than the second electrolyte layer, and a difference in the ion conductivity between the first electrolyte layer and the second electrolyte layer is from 2 times to $10^4$ times;
wherein the first electrolyte layer comprises LiFSI, and the second electrolyte layer comprises poly(ethylene glycol) methyl ether acrylate (PEGMEA), poly(ethylene glycol) diacrylate (PEGDA), succinonitrile (SN), and LiTFSI;
wherein the lithium metal layer is formed by migration of lithium ions from the positive electrode after charging, and
wherein the positive electrode comprises a lithium metal compound represented by any one of the following Chemical Formula 3 to 8, or mixtures thereof:

$$LiM^3_e Mn_{1-e}O_2 \qquad \text{[Chemical Formula 3]}$$

in Chemical Formula 3, 0≤e<0.5, and $M^3$ is an element of one or more types selected from the group consisting of Cr, Al, Ni, Mn and Co, $$Li_2M^4O_2 \qquad \text{[Chemical Formula 4]}$$

in Chemical Formula 4, $M^4$ is Cu,

  [Chemical Formula 5]

in Chemical Formula 5, −0.1≤f≤1, 0≤g≤0.5, −0.1≤h≤0.5, and $M^5$ is an element of one or more types selected from the group consisting of Mn, Fe, Co, Cu, Zn, Mg and Cd,

  [Chemical Formula 6]

in Chemical Formula 6, i is 0.05≤i<0.5, and $M^6$ is an element of one or more types selected from the group consisting of Cr, Al, Ni, Mn and Co,

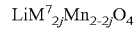  [Chemical Formula 7]

in Chemical Formula 7, j is 0.05≤j<0.5, and $M^7$ is an element of one or more types selected from the group consisting of Cr, Al, Ni, Mn and Co, and

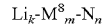  [Chemical Formula 8]

in Chemical Formula 8, $M^8$ represents an alkaline-earth metal, k/(k+m+n) is from 0.10 to 0.40, m/(k+m+n) is from 0.20 to 0.50, and n/(k+m+n) is from 0.20 to 0.50).

2. The lithium secondary battery of claim 1, wherein the first electrolyte layer has ion conductivity of $10^{-5}$ S/cm to $10^{-2}$ S/cm, and
the second electrolyte layer has ion conductivity of $10^{-6}$ S/cm to $10^{-3}$ S/cm.

3. The lithium secondary battery of claim 1, wherein one or more of the first electrolyte layer and the second electrolyte layer are a semisolid electrolyte or a solid electrolyte.

4. The lithium secondary battery of claim 1, wherein the first electrolyte layer has a thickness of 0.1 μm to 20 μm, and the second electrolyte layer has a thickness of 0.1 μm to 50 μm.

5. The lithium secondary battery of claim 1, wherein the electrolyte further comprises at least one additional electrolyte layer formed on the second electrolyte layer facing the positive electrode.

6. The lithium secondary battery of claim 5, wherein the electrolyte layer facing the positive electrode of the at least one additional electrolyte layer formed on the second electrolyte layer has higher ion conductivity than the second electrolyte layer.

7. The lithium secondary battery of claim 6, wherein the at least one additional electrolyte layer formed on the second electrolyte layer is a third electrolyte layer.

8. The lithium secondary battery of claim 6, wherein the electrolyte layer facing the positive electrode of the at least one additional electrolyte layer formed on the second electrolyte layer has ion conductivity of $10^{-5}$ S/cm to $10^{-2}$ S/cm.

9. The lithium secondary battery of claim 1, wherein the electrolyte has a separator provided between the first electrolyte layer and the second electrolyte layer.

10. The lithium secondary battery of claim 9, wherein the separator is provided in a form of being impregnated into the electrolyte.

11. The lithium secondary battery of claim 1, wherein the lithium metal layer is formed through a one-time charge in a voltage range of 4.5 V to 2.5 V.

12. The lithium secondary battery of claim 1, wherein the positive electrode further comprises one or more of positive electrode active material selected from the group consisting of $LiCoO_2$, $LiNiO_2$, $LiMnO_2$, $LiMn_2O_4$, $Li(Ni_aCo_bMn_c)O_2$ wherein 0<a<1, 0<b<1, 0<c<1, and a+b+c=1, $LiN_{1-y}Co_yO_2$, $LiCo_{1-y}Mn_yO_2$, $LiNi_{1-y}Mn_yO_2$ wherein 0≤Y<1, $Li(Ni_aCo_bMn_c)O_4$ wherein 0<a<2, 0<b<2, 0<c<2, and a+b+c=2, $LiMn_{2-z}Ni_zO_4$, $LiMn_{2-z}Co_zO_4$ wherein 0<Z<2, $Li_xM_yMn_{2-y}O_{4-z}A_z$ wherein 0.9≤x≤1.2, 0<y<2, 0≤z<0.2, M is one or more of Al, Mg, Ni, Co, Fe, Cr, V, Ti, Cu, B, Ca, Zn, Zr, Nb, Mo, Sr, Sb, W, Ti and Bi, and A is one or more anions of −1 or −2 valency, $Li_{1+a}Ni_bM'_{1-b}O_{2-c}A'_c$ wherein 0≤a≤0.1, 0≤b≤0.8, 0≤c<0.2, M' is one or more types selected from the group consisting of octahedral stable elements such as Mn, Co, Mg or Al, and A' is one or more anions of −1 or −2 valency, $LiCoPO_4$ and $LiFePO_4$.

13. The lithium secondary battery of claim 1, wherein the positive electrode comprises a lithium metal compound represented by Chemical Formula 3.

14. The lithium secondary battery of claim 1, wherein the positive electrode comprises a lithium metal compound represented by Chemical Formula 4.

15. The lithium secondary battery of claim 1, wherein the positive electrode comprises a lithium metal compound represented by Chemical Formula 5.

16. The lithium secondary battery of claim 1, wherein the positive electrode comprises a lithium metal compound represented by Chemical Formula 6.

17. The lithium secondary battery of claim 1, wherein the positive electrode comprises a lithium metal compound represented by Chemical Formula 7.

18. The lithium secondary battery of claim 1, wherein the positive electrode comprises a lithium metal compound represented by Chemical Formula 8.

* * * * *